UNITED STATES PATENT OFFICE.

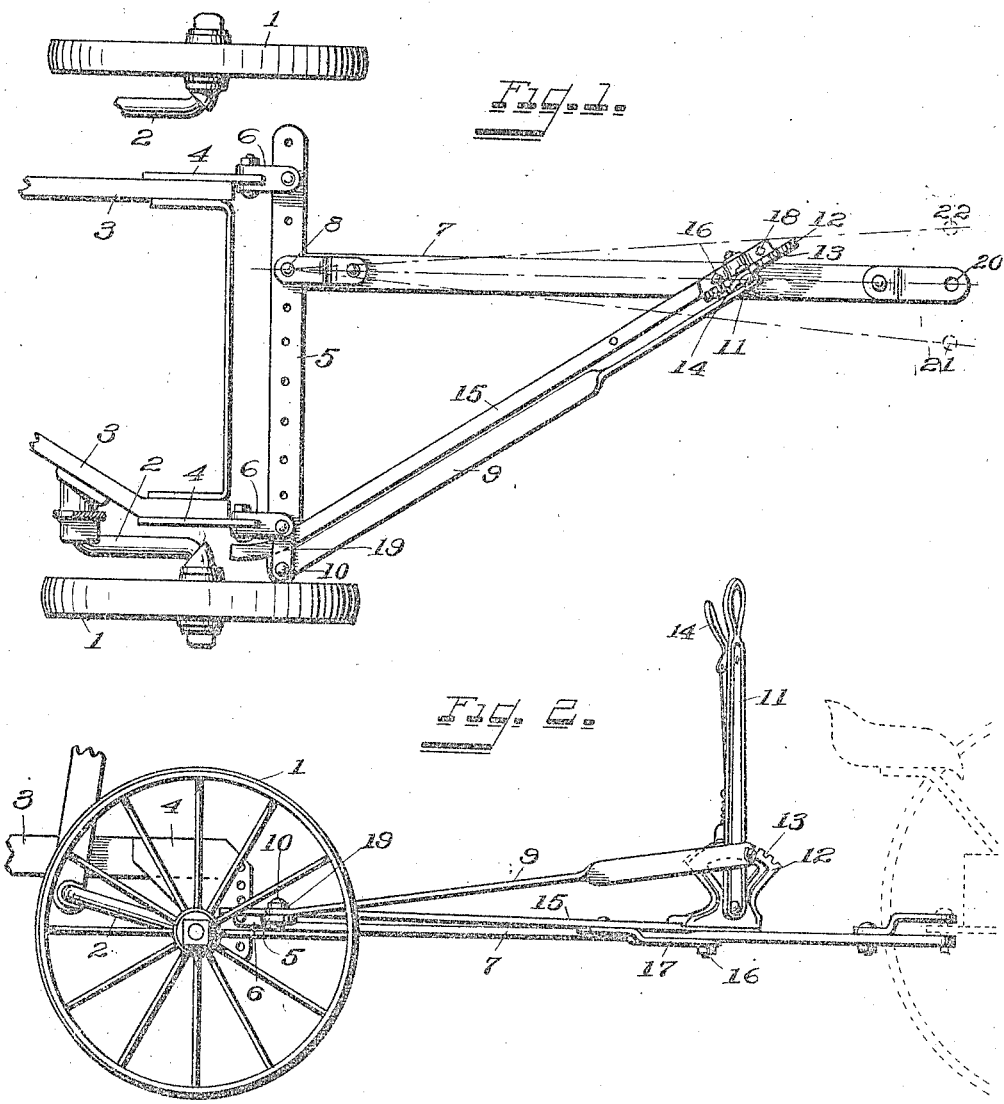

JAMES ALFRED LONSDALE, OF PRINCEVILLE, ILLINOIS.

DRAFT-ADJUSTER.

1,249,436.

Specification of Letters Patent.

Patented Dec. 11, 1917.

Application filed May 31, 1916. Serial No. 100,890.

*To all whom it may concern:*

Be it known that I, JAMES ALFRED LONSDALE, a citizen of the United States, and a resident of Princeville, in the county of Peoria and State of Illinois, have invented certain new and useful Improvements in Draft-Adjusters, of which the following is a full, clear, and exact description, reference being had to the accompanying drawings, forming part of this specification.

My invention relates primarily to means for adjusting the line of draft of a vehicle which is being towed by a traction engine and more particularly to tractor plows, though capable of advantageous use in connection with other farm implements. The object of my invention is the provision of means whereby the trailing implement may have its line of draft adjusted so as to properly perform its functions, such adjustment being made by the operator of the traction engine and without stopping the engine or moving from his driving position.

The novelty of my invention will be hereinafter more fully set forth and specifically pointed out as the specification proceeds, and in the claims.

In the accompanying drawings:

Figure 1 is a plan view of a device embodying my invention, showing the same attached to the frame of a gang plow.

Fig. 2 is a side elevation of Fig. 1.

The same numerals of reference are used to indicate identical parts in both the figures.
I am aware that there have been several patents issued for devices by means of which the tongue or pole of a road grader or a binder may be angularly adjusted with relation to the machine but these devices require the employment of an additional operator and are operated from the trailing vehicle and not from the engine.

In the use of the modern traction engine particularly for plowing purposes wherein an automatic steering device is provided for guiding the course of the engine from a previously plowed furrow and where the land being plowed is other than horizontal, there is a constant tendency for the trailing plow to drift downhill and this tendency results in a position of the plow wherein considerably less than a full furrow is cut, when the furrow is being turned downhill, and considerably more than a full furrow when turning the earth uphill.

The conditions enumerated above become greatly exaggerated when the land being plowed is partly level and partly inclined in which case the drift of the plows so disturbs the line of the furrows that after a land has been traversed a sufficient number of times to have completely plowed the same a considerable portion of the land will be left unplowed at the inclined portion thereof thus necessitating the traversing of a part of the plowed land with the engine in order to plow the remaining inclined portion, thus resulting in partially packing down a part of the land just plowed and a considerable loss of time in finishing the land.

For purposes of illustration and to show one form of the embodiment of my invention I have shown diagrammatically a frame structure of a tractor plow having ground wheels 1 mounted on crank axles 2 and supporting the plow beams 3 to which the clevis plates 4 are attached, the latter affording means of attachment for the usual perforated cross bar 5 through the medium of connectors 6.

The usual draw bar 7 is pivotally connected as at 8 to the cross bar 5 and a connecting rod 9 is pivotally attached as at 10 to one end of the cross bar 5 and is pivotally attached at its opposite end to an operating lever 11.

The operating lever 11 is mounted on a quadrant 12 which is provided with notches 13, which latter are adapted to be engaged by a bolt on the lever 11 to retain the latter in any adjusted position with relation to the quadrant. A latch handle 14 is provided to operate the latching bolt of the lever after the usual manner of such levers.

A brace rod 15 is provided and pivotally attached to the draw bar 7 by having a bolt 16 passed through the foot of the quadrant 12, the brace rod 15, draw bar 7, and lower brace 17, the bolt 16 serving as a part of the means for holding the quadrant in place in addition to acting as the pivotal connection between the draw bar and the brace rod. As will be seen in Fig. 1 the brace rod 15 is carried beyond the draw bar 7 and a bolt 18 is passed therethrough and through the foot of the quadrant 12 to further secure the quadrant on the brace rod as will be readily understood.

The rear end of the brace rod passes through a clip 19 and is guided therein to steady the rear end of the brace rod.

The operation of the device is as follows:

Assuming the parts to be in the position shown in full lines in Fig. 1 and that such position is proper when the plow is being operated on level ground and that the contour of the ground changes from a level condition and the plow drifts from its proper position behind the tractor, the operator by moving the lever 11 toward himself will shift the coupling point 20 to the dotted position 21, or by moving the lever away from himself will shift the coupling point 20 to the dotted position 22, the direction of movement of the lever being determined by the inclination of the ground.

It will be observed that the location and arrangement of the means for adjusting the line of draft is such that these means are easily within reach of the operator of the tractor, the rear end of the tractor and the operator's seat being shown diagrammatically by the dotted lines in Fig. 2, and further that these means may be operated without interrupting the progress of the tractor and that when level ground is again reached the line of draft may be readjusted so that at all times a full furrow may be cut by the plows, or a full operation of any other trailing vehicle may be secured.

Having thus fully described my invention, I claim:

1. In a draft adjuster the combination of a draw bar pivotally connected to a trailing vehicle and to a draft vehicle, a brace rod pivotally mounted on said draw bar and being guided on the draft vehicle, a quadrant mounted on said brace rod, a lever mounted on said quadrant and in a position to be operated by an operator on the draft vehicle, and a connecting rod extending from said lever to the trailing vehicle whereby when the said lever is operated said draw bar will be shifted angularly.

2. In a draft adjuster the combination of a draw bar pivotally connected to a trailing vehicle and connected to a draft vehicle, a brace rod pivotally connected to said draw bar and having its rear end guided in a clip mounted on said trailing vehicle, a clip embracing and guiding the rear end of said brace rod and mounted on a trailing vehicle, a quadrant mounted on said brace rod adjacent its pivotal connection with said draw bar, a lever mounted on said quadrant and in position to be operated by an operator on the draft vehicle, latch mechanism on said lever coacting with said quadrant to maintain said lever in any adjusted position, and a connecting rod extending from said lever to the draft vehicle.

JAMES ALFRED LONSDALE.